United States Patent
Ruan

(10) Patent No.: US 8,025,470 B2
(45) Date of Patent: Sep. 27, 2011

(54) PAY-OUT AND TAKE-UP DEVICE FOR TIGHTENER

(75) Inventor: Buqin Ruan, Zhugang Town (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 393 days.

(21) Appl. No.: 12/408,651

(22) Filed: Mar. 20, 2009

(65) Prior Publication Data

US 2010/0166521 A1    Jul. 1, 2010

(30) Foreign Application Priority Data

Dec. 29, 2008  (CN) .......................... 2008 1 0187640

(51) Int. Cl.
*B60P 7/00*         (2006.01)
(52) U.S. Cl. ....................... 410/103; 410/100
(58) Field of Classification Search .............. 410/12, 410/34, 97, 100, 103; 242/412; 254/220, 254/229, 343; 24/68 CD
See application file for complete search history.

(56) References Cited

U.S. PATENT DOCUMENTS 5,118,232 A * 6/1992 Shuker ............................ 410/98

FOREIGN PATENT DOCUMENTS

CN          101181937 A     5/2008
* cited by examiner

*Primary Examiner* — Stephen Gordon
(74) *Attorney, Agent, or Firm* — Cheng Law Group, PLLC

(57) ABSTRACT

The present invention provides a pay-out and take-up device for a tightener in the mechanical field. The pay-out and take-up device of the invention includes a casing fixedly connected to the side of the holder and a worm, a worm axis and a worm wheel set within the casing, in which the worm wheel is fixedly connected to the extension end of the belt axis, and the worm axis is provided on the side of the worm wheel and could move in the axial direction thereof within the casing, and the worm is covered on the worm axis and fixedly connected to the worm axis. A guide mechanism is placed between the casing and the worm or between the casing and the worm axis, in which the worm axis could move in the axial direction thereof when the worm axis rotates. The worm axis or the worm could be detached from the guide mechanism when the worm is engaged with the worm wheel. A power mechanism is further provided on the holder. A transmission mechanism is provided between the power mechanism and the worm axis for transmitting the power. The device of the invention has the benefits of simple operation, high binding efficiency and excellent applicability.

10 Claims, 4 Drawing Sheets

PAY-OUT AND TAKE-UP DEVICE FOR TIGHTENER

BACKGROUND OF THE INVENTION

1. Field of Invention

The present invention relates to a tightener and a capstan for binding goods during logistics transportation, in particular, to a pay-out and take-up device of a belt axis for the tightener in the mechanical field.

2. Related Art

Goods usually desire to be bound during transportation by automobiles to prevent the goods falling off and colliding with each other to cause loss or damage during travel of the automobiles. Though cords are conventionally directly used to bind the goods, they are work and time consuming and could hardly bind the goods tightly. The tightener is an advanced binding means, the use of which is very popular among drivers due to convenience and safety.

The conventional tightener is made of a holder, a belt axis and a binding strip. The belt axis is connected to the holder and rotatable. The binding strip is wound around the belt axis. A crowbar hole is set on the outer end of the belt axis beyond the holder. The crowbar is inserted into the crowbar hole to turn the crowbar to drive the belt axis to rotate when the goods are to be bound. The problem of such a mechanism lies in that the crowbar needs to be pulled out and reinserted every time it has been rotated some degree, which is work and time consuming and could hardly bind the goods tightly, thereby making the binding process low efficient.

To this end, various kinds of rapid binding devices are designed, such as the tensioner disclosed in China Patent Publication CN101181937A. Said tensioner includes a body in which a rotatable reel is provided. A chain is wound around the reel. A hook is provided on the outer end of the chain. Another hook is fixedly connected to the body. A worm wheel is set on the reel. A worm is further provided within the body which could be turned. The worm is engaged with said worm wheel and the outer end of the worm extends out of the body.

The above two hooks are hung on the goods when the goods are to be bound. Then the worm is turned to drive the worm wheel to rotate. The worm wheel is fixedly connected to the reel, so that the chain is furled once the reel is driven by the worm wheel to rotate, thereby the goods are bound tightly.

Apparently, the goods could be bound through the above-mentioned tensioner with the disadvantage that the binding process is work and time consuming because the worm is turned by the operator. Furthermore, the worm could contact with the worm wheel for the worm is not positioned after it is detached from the worm wheel. The contact of the worm with the worm wheel would make noise during use of the winch, which abrades the worm and the teeth of the worm wheel and reduces the use life. In addition, the parting and engagement of the worm and the worm wheel are totally manually controlled by the operator, causing the tightener inconvenient for use.

Other current tighteners also have the similar problem.

SUMMARY OF THE INVENTION

In order to address the existing problem of the prior art, an object of the invention is to provide a pay-out and take-up device for a tightener which does not require manual operation, is simple to use, and provides a higher binding efficiency.

The object of the invention is achieved by a pay-out and take-up device for a tightener, in which a rotatable belt axis is provided on a holder of the tightener, and one end of the belt axis extends out of the holder. The device of the invention includes a casing fixedly connected to the side of the holder and a worm, a worm axis and a worm wheel set within the casing, in which the worm wheel is fixedly connected to the extension end of the belt axis, and the worm axis is provided on the side of the worm wheel and could move in the axial direction thereof within the casing, and the worm is covered on the worm axis and fixedly connected to the worm axis. A guide mechanism is placed between the casing and the worm or between the casing and the worm axis, in which the worm axis could move in the axial direction thereof when the worm axis rotates. The worm axis or the worm could be detached from the guide mechanism when the worm is engaged with the worm wheel. A power mechanism is further provided on the holder. A transmission mechanism is provided between the power mechanism and the worm axis for transmitting the power.

The belt axis on the tightener could tighten the binding strip during rotation, so that the goods are bound tightly via the tightened binding strip.

The worm axis is turned to separate the worm from the worm wheel and the worm will not be engaged with the worm wheel by the guide mechanism when the goods need be discharged. Obviously, the worm wheel could rotate freely in this case, that is to say, the belt axis is not locked and the binding strip could be loosened rapidly.

While the goods are bound, the worm axis is turned to drive the worm to rotate, and the worm is engaged with the worm wheel via the guide mechanism, and meanwhile the worm axis or the worm is detached from the guide mechanism. Apparently, the worm could only rotate in one way for the worm is engaged with the worm wheel, that is to say, the binding strip is tightened by using the belt axis through unidirectional rotation. The worm wheel and worm themselves have a reverse self-locking function, thus the worm wheel could not reversely rotate in such a case. Therefore, the tightened binding strip could not be loosened.

According to the pay-out and take-up device for the tightener of the invention, the transmission mechanism is a gear group, the input gear of which is fixedly connected with the power mechanism and the output gear of which is linked with the worm axis. Power transmission is accomplished through the gear group.

According to the pay-out and take-up device for the tightener of the invention, the gear group is consisted of an input gear, a transition gear and an output gear, in which both the input gear and the output gear are engaged with the transition gear. Power transmission is accomplished through said three gears.

According to the pay-out and take-up device for the tightener of the invention, the input gear, transition gear and output gear are located within the casing. The positions of said three gears in the casing could prevent impurities entering into the engaged sites of the gears and the stability of power transmission is enhanced thereby.

As an alternative, in the pay-out and take-up device for the tightener of the invention, the transmission mechanism includes a transmission worm and a transmission worm wheel in which the transmission worm is linked with the power mechanism, the transmission worm wheel is fixedly connected with the worm axis and the transmission worm is engaged with the transmission worm wheel. The object of power transmission is also accomplished by the transmission worm and the transmission worm wheel, and the transmission worm and the transmission worm wheel have a further function of speed reduction, so as to produce a relatively low rotation speed input to the worm axis.

According to the pay-out and take-up device for the tightener of the invention, a sensor is provided between the casing and the worm axis for detecting the binding force of the tightener. When the binding force of the tightener is detected by the sensor, the sensor could indicate the binding force or control the power mechanism to stop running.

According to the pay-out and take-up device for the tightener of the invention, the power mechanism is a motor, the rotation shaft of which is fixedly connected with said input gear. The input gear is driven to rotate by the motor during operation.

According to the pay-out and take-up device for the tightener of the invention, the power mechanism is an air motor, the rotation shaft of which is fixedly connected with said input gear. The input gear is driven to rotate by the air motor during operation.

According to the pay-out and take-up device for the tightener of the invention, a rotary liner is axially fixedly connected to the outer side of the casing, which is circumferentially fixed with the worm axis. The output gear is fixedly connected with the rotary liner.

Therefore, the worm axis is driven to rotate once the rotary liner is turned. Meanwhile, the worm axis is moved within the rotary liner, so that the rotary liner is directly turned during operation of the tightener.

According to the pay-out and take-up device for the tightener of the invention, the guide mechanism is a locating part fixed to the inner side of the casing and could be embedded in the teeth of the worm. The rotary liner is axially fixed outside the casing. The outer end of the worm axis extends out of the casing and is circumferentially fixed with the rotary liner. The worm axis is moved, the worm is engaged with the worm wheel and the worm is detached from the locating part when the rotary liner is turned.

The belt axis of the tightener could tighten the binding strip during rotation. The goods on the automobiles are bound tightly through the tightened binding strip.

When the worm is separate from the worm wheel, the teeth on the worm contact with the locating part. The worm is not engaged with the worm wheel unless the worm axis is turned. It is obvious that the worm wheel could rotate reversely in this case, that is to say, the belt axis is not locked and the binding strip could be loosened rapidly.

During the process of binding the goods, the locating part is embedded in the teeth of the worm and the locating part is stationary, so that the worm axis could move along the axial direction thereof during rotation when the outer end of the worm axis is turned. The worm could be engaged with the worm wheel after the worm axis moves a distance, and the teeth of the worm would be detached from the locating part when the worm is completely engaged with the worm wheel. The worm wheel and worm themselves have a reverse self-locking function, thus the worm wheel could only rotate in one way, and the binding strip is tightened by the belt axis through unidirectional rotation. Therefore, the binding strip is tightened to bind the goods because the belt axis could not turn reversely.

According to the pay-out and take-up device for the tightener of the invention, the locating part includes a positioning pin and a bolt, in which a projected shoulder is provided on the side of one end of the positioning pin. A connecting hole is provided through the casing which is embodied as a step hole having a projected block step. The bolt is threadedly connected with the connecting hole and pressed against the positioning pin. The shoulder of the positioning pin is pressed against the block step. The other end of the positioning pin is located within the casing.

The positioning pin is pressed after the bolt is connected to the connecting hole, and the shoulder of the positioning pin is pressed against the block step of the connecting hole at the same time, so that one part of the positioning pin extends into the casing while it is fixed.

According to the pay-out and take-up device for the tightener of the invention, the guide mechanism includes a threaded connection part on the worm axis and a threaded connection pore on the casing, in which the threaded connection part could be threadedly coupled with the threaded connection pore.

It is obvious that the process of contacting the locating part with the worm is replaced by that of coupling the threaded connection part with the threaded connection pore which could also achieve the purpose of controlling the belt axis.

According to the pay-out and take-up device for the tightener of the invention, teeth are provide on the side of the outer end of the worm axis, and grooves matched with the teeth are placed on the inner side of the rotary liner. In addition, the teeth are embedded in the grooves.

The worm axis is circumferentially fixed with the rotary liner by matching the teeth with the grooves.

According to the pay-out and take-up device for the tightener of the invention, a rubber pad is provided between the positioning pin and the bolt, which could be replaced with a spring in accordance with actual requirements. The rubber pad or spring acts to displace the positioning pin slightly.

According to the pay-out and take-up device for the tightener of the invention, a pad is fixedly connected to the casing corresponding to the position of the worm. The worm could be in contact with the pad after it is moved. It is obvious that the worm could be prevented from contacting with the casing directly by using the pad.

According to the pay-out and take-up device for the tightener of the invention, an oil mouth is located outside the casing, through which lubricant is injected into the casing to lubricate the worm and the worm wheel.

Compared with the prior art, the pay-out and take-up device for the tightener of the invention could automatically bind the goods by controlling the power mechanism. Furthermore, the device could automatically stop running once the goods are tightened. Therefore, the tightener is easy to operate and has a higher binding efficiency.

Meanwhile, the specific values of the controller could be set, thus it could be applied in different binding circumstances.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
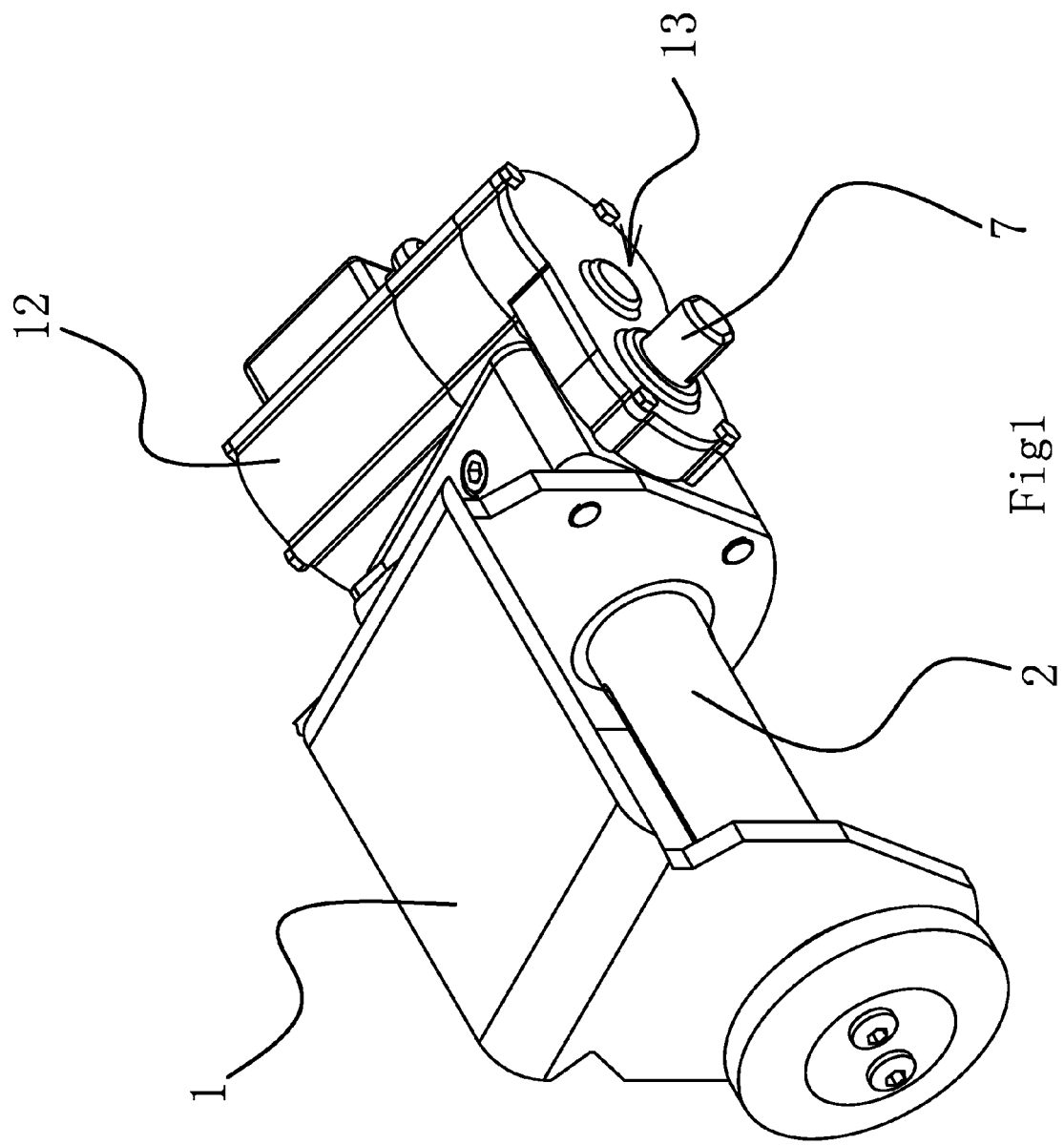
FIG. 1 is a structural stereogram of the tightener having the pay-out and take-up device of the invention.

As shown in FIG. 1, a tightener has a holder 1 and a belt axis 2 connected thereto, in which one end of the belt axis 2 extents out of the holder 1.

Figure 2:
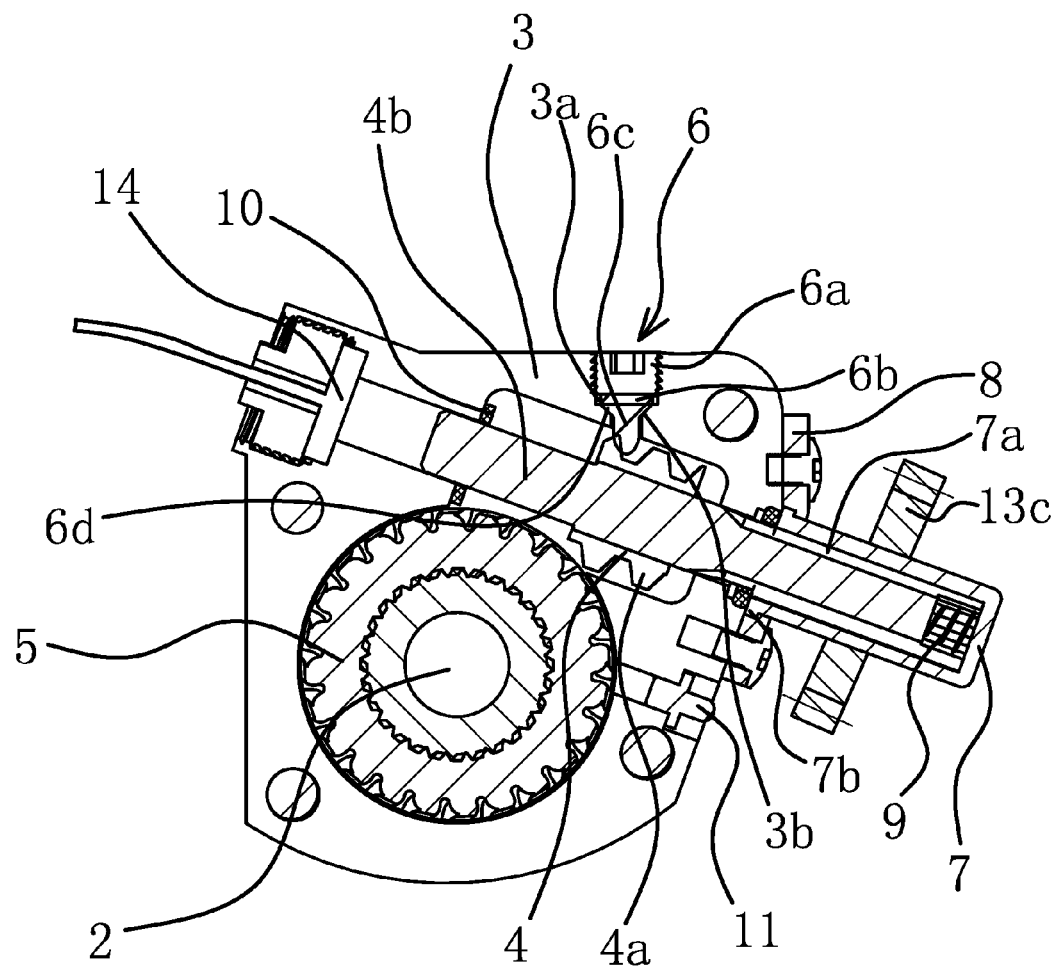
FIG. 2 is a structural diagram of the pay-out and take-up device for the tightener of the invention when the worm is separate from the worm wheel.

As shown in FIG. 2, a casing 3 having a cavity therein is fixedly connected to the side of the holder 1, where the pay-out and take-up device for the tightener is provided. The device includes a worm 4, a worm axis 4b, a worm wheel 5, a locating part 6 and a rotary liner 7.

The worm 4 is coupled to the worm axis 4b and fixedly connected with the worm axis 4b.

The worm wheel 5 is fixedly connected to the extension end of the belt axis 2. The worm axis 4b is also fixed within the casing 3. The worm axis 4b is located on side of the worm wheel 5 and one end of the worm axis 4b extends out of the casing 3. Several teeth 4a are provided on the outer side of the worm axis 4b, which are axially disposed along the worm axis 4b.

Grooves 7a matched with the teeth 4a are placed on the inner side of the rotary liner 7. The teeth 4a on the outer side of the worm wheel 5 are embedded in the grooves 7a. The rotary liner 7 is covered on the end of the worm axis 4b and then the rotary liner 7 is circumferentially fixed with the worm axis 4b through the teeth 4a and the grooves 7a.

A protrusion edge 7b is provided on the end of the rotary liner 7, which is projected outward. A fixed plate 8 is fixedly connected to the casing 3. The rotary liner 7 passes through the fixed plate 8 and the protrusion edge 7b of the rotary liner 7 is located between the fixed plate 8 and the casing 3. In this case, the rotary liner 7 could not be displaced but could be turned.

A locating part 6 is further provided on the casing 3. The locating part 6 is consisted of a bolt 6a, a rubber pad 6b and a positioning pin 6c. A connecting hole 3a is provided through the casing 3, which is a step hole having a projected block step 3b. A shoulder 6d matched with the block step 3b is provided at one end of the positioning pin 6c. The bolt 6a is threadedly connected with the connecting hole 3a and then pressed against the positioning pin 6c. The rubber pad 6b is located between the bolt 6a and the positioning pin 6c. One part of the other end of the positioning pin 6c extends into the casing 3.

In one embodiment of the invention, a spring 9 is provided between the rotary liner 7 and the worm 4. When the worm 4 moves to one side, the spring 9 is in a stressed state. That is to say, the teeth of the worm 4 are pressed against the positioning pin 6c under action of the spring 9. Moreover, the worm 4 is not engaged with the worm wheel 5 in this case.

A power mechanism 12 linked with the rotary liner is fixedly connected to the holder 1. In said embodiment, the power mechanism 12 is a motor. The power mechanism 12 could also be an air pump in accordance with the actual condition. A sensor 14 is provided within the casing 3. In said embodiment, the sensor 14 is set at the stressed position of the worm axis 4b. The sensor 14 could also be located at the stressed position of the worm 4. A controller is provided between the sensor 14 and the power mechanism 12.

Figure 4:
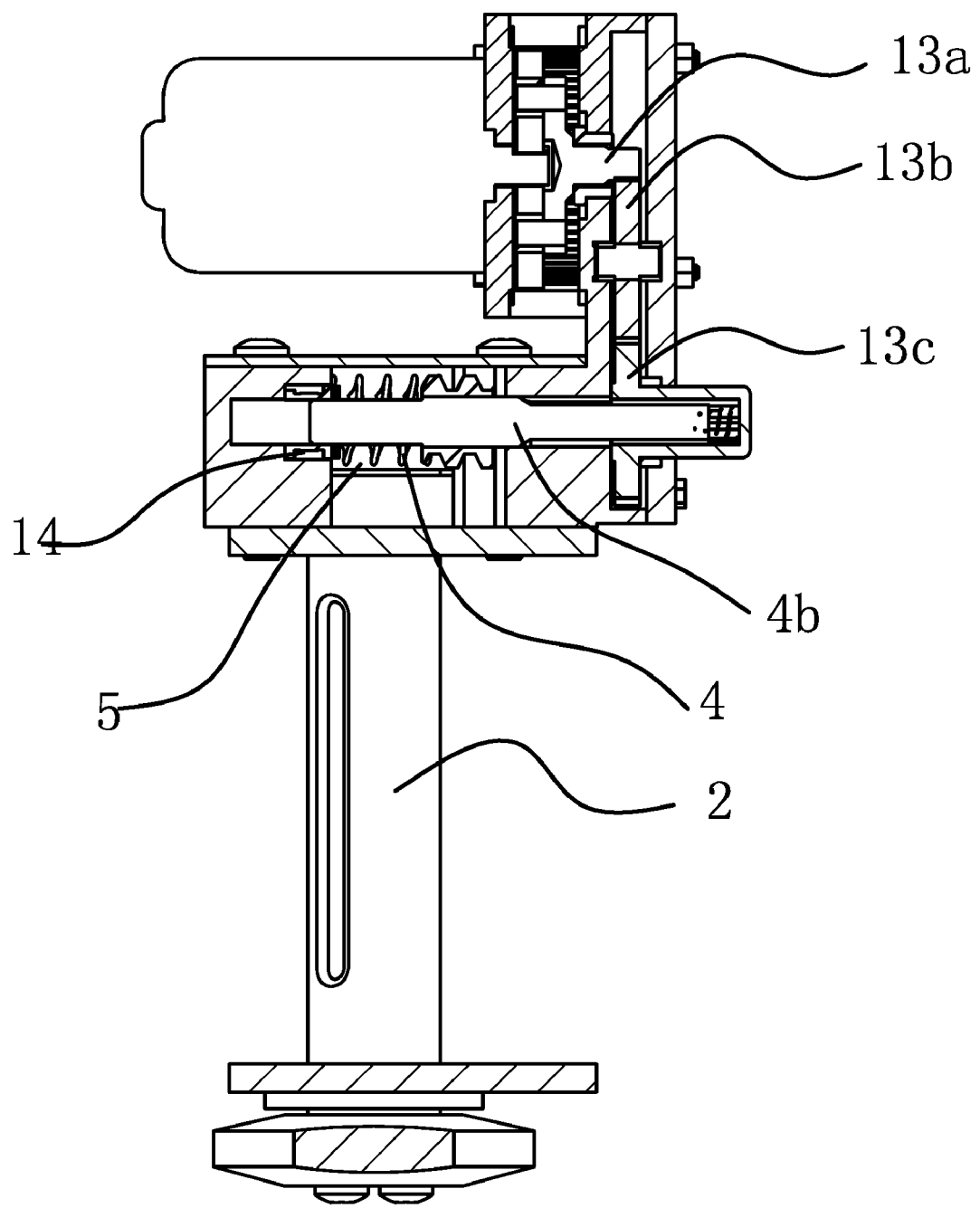
FIG. 4 is a sectional view of the pay-out and take-up device for the tightener of the invention.

As shown in FIG. 4, a gear group 13 is positioned between the power mechanism 12 and the rotary liner 7. The input end of the gear group 13 is fixedly connected with the rotation shaft of the motor, and the output end of the gear group 13 is fixedly connected with the rotary liner 7. The gear group 13 is consisted of an input gear 13a, a transition gear 13b and an output gear 13c.

The spring is in an unstressed stated after the worm 4 is moved to another side by the power mechanism. The worm 4 is engaged with the worm wheel 5 and the positioning pin 6c does not contact with the teeth of the worm 4.

In FIG. 2, when the strip is loosened by using the tightener having the device of the invention, the worm 4 is not engaged with the worm wheel 5, and the teeth of the worm 4 are always pressed against the positioning pin 6c under the action of the spring 9. The worm 4 is not engaged or in contact with the worm wheel 5 unless the rotary liner 7 is turned. In this case, the worm wheel 5 could rotate freely, and the binding strip is accordingly loosened by the belt axis 2 during free rotation.

Figure 3:
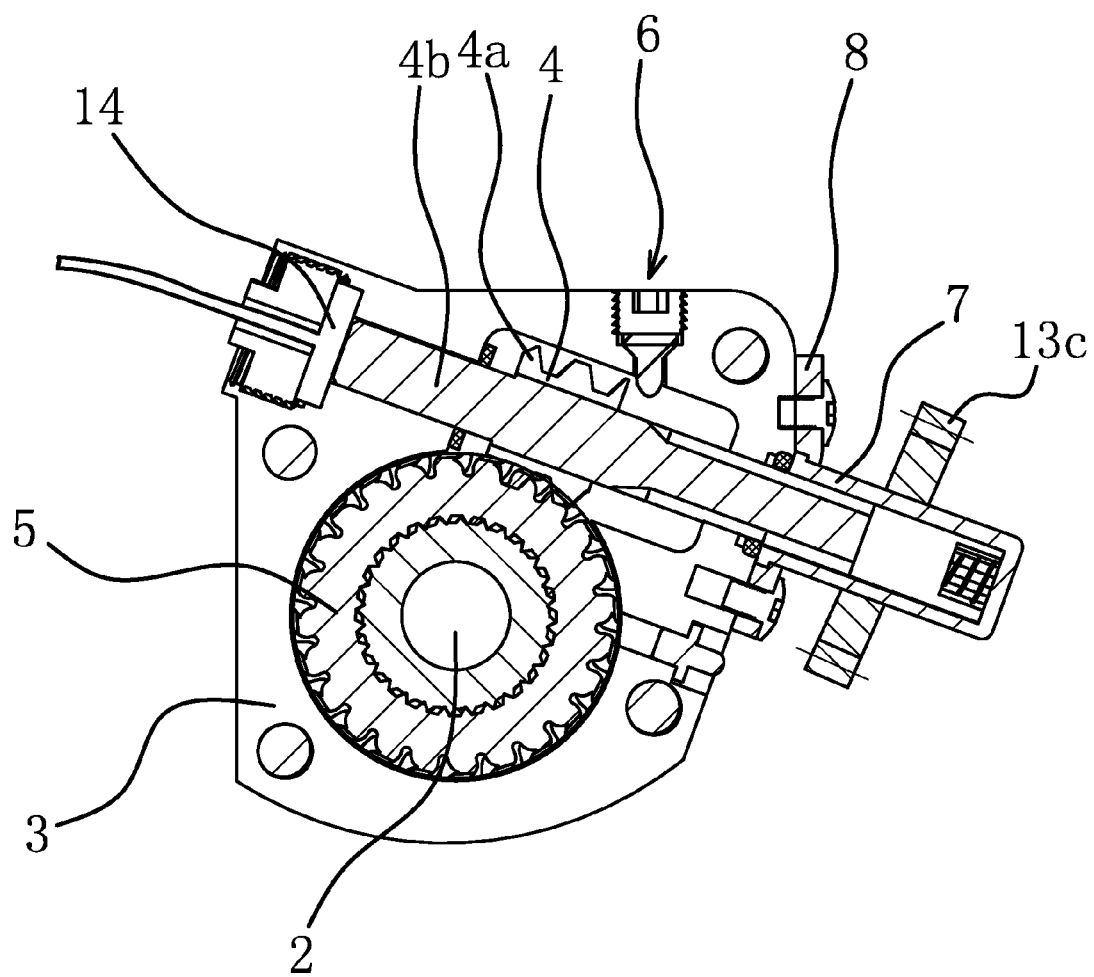
FIG. 3 is a structural diagram of the pay-out and take-up device for the tightener of the invention when the worm is engaged with the worm wheel.

As shown in FIG. 3, the motor starts to run to drive the rotary liner 7 to rotate via the gear group when the goods are required to be bound. The rotary liner 7 drives the worm 4 to turn during rotation. The teeth of the worm 4 are in contact with the positioning pin 6c, so that the worm 4 could move along the axial direction during rotation. The worm 4 could be engaged with the worm wheel 5 after it moves a distance, during which the positioning pin 6c is still in contact with the teeth of the worm 4. The positioning pin 6c is detached from the teeth of the worm 4 when the worm 4 is completely engaged with the worm wheel 5. In this case, the worm wheel 5 could only rotate in one way and not rotate reversely due to self-locking. This way, the belt axis 2 is driven to always rotate in one way by the worm wheel 5. Therefore, the binding strip is tightened by the belt axis 2 rotating in one way to bind the goods tightly. In said embodiment, a pad 10 is fixedly connected to the inner side of the casing 3 corresponding to the position of the end of the worm 4. The worm 4 is prevented from contacting with the inner side of the casing 3 directly by using the pad 10.

The worm axis 4b contacts with the sensor 14 during continuous rotation after the goods are bound tightly. The tensioning force signal of the binding strip is collected and compared with a predetermined value of the tensioning force of the binding strip preset in the controller by the sensor 14. The central controller could control the power mechanism 12 of the tightener to cease working when the tensioning force signal of the binding strip exceeds the predetermined value of the tensioning force of the binding strip.

In addition, in order to lubricate the worm 4 and the worm wheel 5, an oil mouth 11 is provided outside the casing 3 for injecting lubricant.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although these terms are used herein, such as holder 1, belt axis 2 and casing 3, the other similar terms could also be used. These terms are merely used to describe and explain the essence of the invention more conveniently, and any limitation to said terms is regarded as departing from the spirit of the invention.

LIST OF REFERENCE NUMERALS 1 holder
2 belt axis 3 casing
3a connecting hole
3b block step
4 worm
4a teeth
4b worm axis
5 worm wheel
6 locating part
6a bolt
6b rubber pad
6c positioning pin
6d shoulder
7 rotary liner
7a groove
7b protrusion edge
8 fixed plate
9 spring
10 pad
11 oil mouth
12 power mechanism
13 gear group
13a input gear
13b transition gear
13c output gear
14 sensor

What is claimed is:

1. A pay-out and take-up device for a tightener, in which a rotatable belt axis (2) is provided on a holder (1) of the tightener, one end of the belt axis (2) extends out of the holder (1), the device includes a casing (3) fixedly connected to a side of the holder (1) and a worm (4), a worm axis (4b) and a worm wheel (5) set within the casing (3), the worm wheel (5) is fixedly connected to an extension end of the belt axis (2), the worm axis (4b) is provided on a side of the worm wheel (5) and could move in an axial direction thereof within the casing (3), the worm (4) is covered on the worm axis (4b) and fixedly connected to the worm axis (4b), characterized in that, a guide mechanism is placed between the casing (3) and the worm (4) or between the casing (3) and the worm axis (4b) in which the worm axis (4b) could move in the axial direction thereof when the worm axis (4b) rotates, the worm axis (4b) or the worm (4) could be detached from the guide mechanism when the worm (4) is engaged with the worm wheel (5), a power mechanism (12) is further provided on the holder (1), and a transmission mechanism is provided between the power mechanism (12) and the worm axis (4b) for transmitting power.

2. The pay-out and take-up device for a tightener as claimed in claim 1, characterized in that, the transmission mechanism is a gear group (13), an input gear (13a) of the gear group (13) is fixedly connected with the power mechanism (12), an output gear (13c) of the gear group (13) is linked with the worm axis (4b), the gear group is consisted of the input gear (13a), a transition gear (13b) and the output gear (13c), and both the input gear and the output gear are engaged with the transition gear (13b).

3. The pay-out and take-up device for a tightener as claimed in claim 1, characterized in that, the transmission mechanism includes a transmission worm and a transmission worm wheel in which the transmission worm is linked with the power mechanism, the transmission worm wheel is fixedly connected with the worm axis (4b) and the transmission worm is engaged with the transmission worm wheel.

4. The pay-out and take-up device for a tightener as claimed in claim 1, characterized in that, a sensor (14) is provided between the casing (3) and the worm axis (4b) for detecting binding force of the tightener.

5. The pay-out and take-up device for a tightener as claimed in claim 1, characterized in that, the power mechanism (12) is a motor, a rotation shaft of which is fixedly connected with an input gear (13a).

6. The pay-out and take-up device for a tightener as claimed in claim 1, characterized in that, a rotary liner (7) is axially fixedly connected to an outer side of the casing (3), the rotary liner (7) is circumferentially fixed with the worm axis (4b), and an output gear (13c) is fixedly connected with the rotary liner (7).

7. The pay-out and take-up device for a tightener as claimed in claim 1, characterized in that, the guide mechanism is a locating part (6) fixed to an inner side of the casing (3) and could be embedded in teeth of the worm (4), a rotary liner (7) is axially fixed outside the casing (3), an outer end of the worm axis (4b) extends out of the casing (3) and is circumferentially fixed with the rotary liner (7), and when the worm axis (4b) is moved, the worm (4) is engaged with the worm wheel (5) and the worm (4) is detached from the locating part (6) when the rotary liner (7) is turned.

8. The pay-out and take-up device for a tightener as claimed in claim 7, characterized in that, the locating part (6) includes a positioning pin (6c) and a bolt (6a), a projected shoulder (6d) is provided on a side of one end of the positioning pin (6c), a connecting hole (3a) is provided through the casing (3) which is a step hole having a projected block step (3b), the bolt (6a) is threadedly connected with the connecting hole (3a) and pressed against the positioning pin (6c), the shoulder (6d) of the positioning pin (6c) is pressed against the block step (3b), and another end of the positioning pin (6c) is located within the casing (3).

9. The pay-out and take-up device for a tightener as claimed in claim 1, characterized in that, the guide mechanism includes a threaded connection part on the worm axis (4b) and a threaded connection pore (3a) on the casing (3), in which the threaded connection part could be threadedly coupled with the threaded connection pore (3a).

10. The pay-out and take-up device for a tightener as claimed in claim 1, characterized in that, teeth (4a) are provide on a side of an outer end of the worm axis (4b), grooves (7a) matched with the teeth are placed on an inner side of a rotary liner (7), and the teeth (4a) are embedded in the grooves (7a).

* * * * *